Patented Dec. 23, 1941

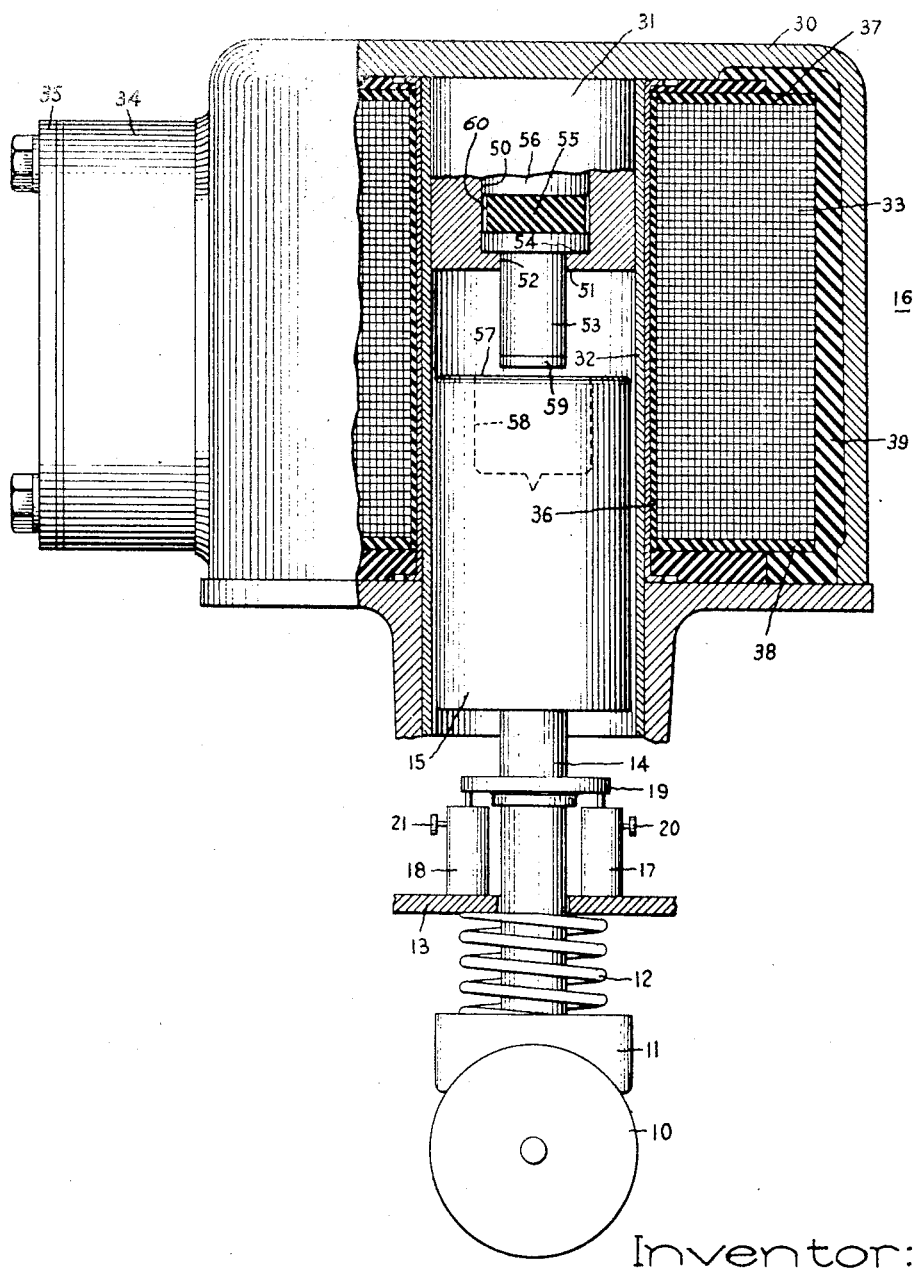

2,267,411

UNITED STATES PATENT OFFICE 2,267,411

ELECTROMAGNET

Jacob W. McNairy, Bridgeport, Conn., assignor to General Electric Company, a corporation of New York Application April 4, 1941, Serial No. 386,904

7 Claims. (Cl. 188—171)

My invention relates to electromagnets and particularly to plunger type electromagnets for releasing the spring applied mechanical brake provided in connection with electric vehicle control systems.

The principal object of my invention is to provide new and improved means for eliminating objectionable noise incident to the energization and deenergization of a solenoid brake magnet while retaining the advantages of direct iron-to-iron contact between the magnet core and plunger.

It is a further object of my invention to provide an inexpensive and durable solenoid brake having improved operating characteristics.

My invention is particularly applicable to friction brakes which are biased to braking position by a spring and released against the force of the biasing spring by a plunger type electromagnet. To cushion the impact of the brake both in brake applying and brake releasing operation, a shock absorber of any desired well known type may be attached to the movable portion of the brake assembly. Preferably such a shock absorber is of the fluid type provided with control means for varying its time of operation. Due to the rapidly increasing magnetic force as the plunger approaches the core in brake releasing operation, the shock absorber does not have equal effects in each direction of operation. For example, if the shock absorber is set to eliminate all objectionable noise in brake applying operation, its effect will be insufficient in brake releasing operation because of the rapidly increasing operating force near the end of the stroke. The time setting required to eliminate objectionable noise in brake releasing operation is so long as to be entirely impracticable. Accordingly the invention also contemplates additional noise eliminating means operable only upon energization of the electromagnet. Such additional noise eliminating means may comprise a rubber buffer engaging a retractable pin which extends from the stationary core of the magnet to engage the movable plunger.

The above construction has the advantage of leaving the air gap between the core and plunger unobstructed, thereby to permit direct iron-to-iron contact in the actuated position of the magnet. As a consequence the plunger may, if desired, be held in its actuated position by a relatively small holding current, whereby expenditure of excess power and heat dissipation difficulties are avoided.

To the attainment of the foregoing and other objects and advantages, my invention is preferably embodied in the detailed construction to be hereinafter more fully described and claimed, and is illustrated in the accompanying drawing, the single figure of which represents a side view, partly in section, of a vehicle solenoid brake constructed in accordance with my invention.

Referring now to Fig. 1, I have shown a brake drum 10 adapted for frictional engagement with a brake shoe 11. The brake shoe 11 is biased to braking position by a spring 12 which may seat at one end upon the brake shoe 11 and at the other end upon a portion 13 of the vehicle frame. For brake releasing operation against the force of the spring 12 the brake shoe 11 is connected through a brake rod 14 to the movable plunger 15 of a solenoid type electromagnet 16. To cushion the impact of the brake in both directions of operation I provide a shock absorber comprising a pair of dash pots 17 and 18 having movable pistons connected to the brake rod 14 through a yoke 19. It will be understood that the dash pots 17 and 18 are arranged to provide a cushioning effect in both directions of operation of the brake rod 14. Preferably the dash pots 17 and 18 are provided with adjustable valves 20 and 21 for varying the cushioning effect in each direction of operation.

The solenoid magnet 16 comprises a casing 30 of magnetic material within which is centrally arranged an iron core 31 and a guiding tube 32. The armature 15 is movable within the tube 32 into and out of engagement with the face of the stationary core 31. Between the casing 30 and the guiding tube 32, and suitably insulated therefrom as shown, is arranged an annular operating coil 33. The terminals of the operating coil 33 are brought out to a terminal box 34 provided with a removable cover 35 for convenient connection of the coil to other apparatus. The coil 33 is shown wound upon a spool 36 of insulating material having end collars 37 and 38. After insertion of the coil within the casing 30 the space between the coil and casing may be filled with an insulating compound 39.

The core 31 is recessed as at 50 and is formed to provide at its lower surface a pole face 51 having a central aperture 52 of smaller diameter than the recess 50. Slidably mounted within the aperture 52 is a small pin 53 of magnetic material having a shoulder 54 positioned within the recess 50. The pin 53 extends beyond the pole face 51 and is partially retractable within the recess 50 of the core. Within the recess 50 a rubber buffer 55 is positioned between the shoulder 54 and an immovable plug 56 of magnetic material. In order to permit iron-to-iron contact between the plunger 15 and the core 31, the pole face 57 of the plunger 15 is provided with a recess 58 for the reception of the extending end of the pin 53.

The above construction, comprising the pin 53 extending into the recess 58 during the upward stroke of the plunger 15, has for its purpose the reduction of the characteristic increase in magnetic pull as the air gap between the core 31 and the plunger 15 is reduced. Although the magnetic force still shows a marked increase as the plunger approaches the core, a more uniform operating force is obtained by this construction due to the fact that, as the pin 53 extends farther in to the recess 58, the leakage path between the sides of the pin and the sides of the recess increases in area and diminishes in reluctance. As the leakage flux increases the face of the core 31 becomes saturated because of the fact that the leakage flux passes radially inward and downwardly across the pole face 51 before entering the pin 53. The effect of the increased leakage flux is that the operating flux crossing the air gap between the core and plunger is limited in amount. The leakage flux exerts no operating force, since its direction is transverse to the direction of movement of the plunger 15. The reduction of the rate of increase of magnetic pull as the plunger approaches the core assists in cushioning the impact of the plunger and core and protects the rubber buffer 55 from excessive wear. For adjustment of the pin 53 a non-magnetic shim 59 may be provided. The shim 59 is effective to prevent shunting of flux from the main air gap when the magnet is in its picked-up position.

In operation, as the pluger 15 is raised by the magnetic force of the operating coil 33, the pin 53 first engages the bottom of the recess 58 and is raised with the plunger. Before the face 57 of the plunger comes into contact with the face 51 of the core 31 the pin 53, now in engagement with the plunger, compresses the rubber buffer 55 to cushion the force of the impact between the plunger and the core. In order to provide for longitudinal compression of the rubber buffer 55 a small annular space 60 is left between the rubber buffer and the recess 50. Within this space the buffer 55 may expand laterally as it is compressed longitudinally. The rubber buffer 55 is sufficiently resilient so that it does not prevent iron-to-iron contact between the plunger 15 and the core 31. As previously pointed out, such direct contact permits the use of a relatively small holding current.

If desired, the operating coil 33 may comprise two separate windings, one of which is energized from trolley voltage to pick up the plunger 15, and the other of which is energized from a local battery source to hold the plunger in picked-up position. A suitable control system for such an arrangement of pick-up and holding coils is described and claimed in my copending application Serial No. 375,125, filed January 21, 1941, and assigned to the same assignee as the instant application.

While I have described one preferred embodiment of my invention by way of example, many other modifications will occur to those skilled in the art, and I, therefore, wish to have it understood that I intend in the appended claims to cover all such modifications as fall within the spirit and scope of my invention.

What I claim as new and desire to secure by Letters Patent of the United States is:

1. In a plunger type electromagnet, a stationary core having a recess and an apertured pole face, a pin of magnetic material extending from said pole face and slidably mounted within said recess, a movable plunger having a pole face provided with a second recess for reception of the extending end of said pin, said pin being spaced from the side walls of said second recess by a transverse air gap and providing as said plunger moves toward said core a leakage flux path of diminishing reluctance through said pin and said transverse air gap thereby to reduce the magnetic force applied to said plunger, and a resilient buffer mounted within the recess of said core and behind said pi nto permit partial retraction of said pin within said core, said buffer being sufficiently resilient to permit direct contact of said pole faces.

2. In a plunger type electromagnet, a stationary core having a recess and an apertured pole face, a movable pin of magnetic material extending from said pole face and having a shoulder positioned within said recess, a plug of magnetic material fixedly located within said core behind said shoulder, a movable plunger having a pole face provided with a second recess for reception of the extending end of said pin, said pin being spaced from the side walls of said second recess by a transverse air gap and providing as said plunger moves toward said core a leakage flux path of diminishing reluctance through said pin and said transverse air gap thereby to reduce the magnetic pull applied to said plunger, and a resilient buffer positioned between said plug and said shoulder to permit partial retraction of said pin.

3. In a solenoid brake of the type comprising a friction brake shoe biased to a braking position and a plunger type electromagnet for moving said brake shoe to a brake releasing position, the combination of a stationary core for said electromagnet having a recess and an apertured pole face, a retractable pin of magnetic material slidably mounted within said core and extending from said apertured pole face, a rubber buffer positioned in said recessed core to engage said pin, and a movable plunger having a pole face provided with a second recess and movable into and out of engagement with said apertured pole face, said pin extending into said second recess to engage said plunger and being partially retractable within said core and against said buffer thereby to cushion impacts between said pole faces, said pin being spaced from the side walls of said second recess by a transverse air gap to provide as said plunger moves toward said core a leakage flux path of diminishing reluctance through said pin and said transverse air gap thereby to reduce the magnetic pull applied to said plunger.

4. In a solenoid brake of the type comprising a friction brake shoe spring-biased to a braking position and a plunger type electromagnet for moving said shoe to a brake releasing position, the combination of a stationary core for said electromagnet having a recess and an apertured pole face, a movable pin extending from said pole face and having a shoulder positioned within said recess, a plug of magnetic material fixedly located within said core behind said shoulder, a rubber buffer between said plug and said shoulder, a recessed movable plunger arranged to engage the extending end of said pin and the face of said core, said pin extending into said recessed plunger and being partially retractable within said core upon engagement with said plunger, and a non-magnetic shim arranged to separate said plunger from said pin, said pin being spaced from said plunger by a transverse air gap so that said pin provides as said plunger moves toward said core a leakage flux path of diminishing reluctance through said pin and said transverse gap thereby to reduce the magnetic pull applied to said plunger.

5. In a solenoid brake of the type comprising a friction brake shoe spring-biased to a braking position and a plunger type electromagnet for moving said shoe to a brake releasing position, the combination of a stationary core for said electromagnet having a recess and an apertured pole face, a retractable pin of magnetic material extending from the pole face of said core, a rubber buffer positioned within said recessed core to engage said pin, and a movable plunger having a pole face provided with a second recess positioned to receive the extending end of said pin, said pin being spaced from the side walls of said second recess by a transverse air gap and providing as said plunger moves toward said core a leakage flux path of diminishing reluctance through said pin and said transverse air gap thereby to reduce the magnetic pull applied to said plunger, said plunger being arranged first to engage said pin to compress said buffer and then to engage the pole face of said core.

6. In a solenoid brake of the type comprising a friction brake shoe spring-biased to a braking position and a plunger type electromagnet for moving said shoe to a brake releasing position, the combination of a stationary core for said electromagnet having a recess and an apertured pole face, a movable pin of magnetic material extending from said pole face and having a shoulder positioned within said recess, a plug of magnetic material fixedly mounted within said core behind said shoulder, a rubber buffer positioned between said plug and said shoulder to permit partial retraction of said pin within said recess, a movable plunger provided with a pole face having a second recess thereby first to engage said pin to compress said buffer against said plug and then to engage the pole face of said core, and a shim of non-magnetic material arranged to provide a longitudinal non-magnetic gap between said pin and said plunger, said pin being spaced from the side walls of said second recess so that it provides as said plunger moves toward said core a leakage flux path of diminishing reluctance through said pin and said transverse air gap thereby to reduce the magnetic pull applied to said plunger.

7. In a solenoid brake of the type comprising a friction brake shoe spring-biased to a braking position and having a fluid shock absorber connected thereto to cushion its movement in both directions and a plunger type electromagnet for moving said shoe to a brake-releasing position, the combination of a stationary core for said electromagnet having a recess and an apertured pole face, a partially retractable pin of magnetic material extending from said pole face and having a shoulder positioned within said recess, a plug of magnetic material fixedly located within said core behind said shoulder, a rubber buffer positioned between said plug and said shoulder to permit a cushioned partial retraction of said pin within said core, a movable plunger provided with a pole face having a second recess for reception of the extending end of said pin, said pin being spaced from the side walls of said second recess by a transverse air gap and providing as said plunger moves toward said core a leakage flux path of diminishing reluctance through said pin and said transverse air gap thereby to reduce the magnetic pull applied to said plunger, and a shim of non-magnetic material mounted upon the extending end of said pin to provide a longitudinal non-magnetic gap between said pin and said plunger.

JACOB W. McNAIRY.